United States Patent [19]

VanHulle et al.

[11] 4,251,551

[45] Feb. 17, 1981

[54] FOOD COMPOSITION AND METHOD FOR PREPARING CHEESE-COATED, PUFFED SNACKS UPON MICROWAVE HEATING

[75] Inventors: Glenn J. VanHulle, Brooklyn Park; Charles A. Anker; Dean E. Franssell, both of Minneapolis, all of Minn.

[73] Assignee: General Mills, Inc., Minneapolis, Minn.

[21] Appl. No.: 43,573

[22] Filed: May 29, 1979

[51] Int. Cl.³ .................... A21D 2/34; A21D 2/36; A23L 1/18

[52] U.S. Cl. .................... 426/94; 426/242; 426/290; 426/293; 426/302; 426/446; 426/458; 426/559; 426/585; 426/613; 426/653; 426/808

[58] Field of Search ........... 426/94, 103, 99, 241, 426/242, 290, 291, 293, 296, 302, 304, 307, 549, 559, 560, 582, 585, 606, 613, 622, 625, 639, 653, 661, 446, 458, 465, 496, 512, 516, 808

[56] References Cited

U.S. PATENT DOCUMENTS

| | | | |
|---|---|---|---|
| 3,027,258 | 3/1962 | Markakis et al. | 426/808 X |
| 3,094,947 | 6/1963 | Green et al. | 426/290 |
| 3,246,990 | 4/1966 | Thompson et al. | 426/446 X |
| 3,253,533 | 5/1966 | Benson | 99/323.4 X |
| 3,464,827 | 9/1969 | Tsuehiya et al. | 426/302 X |
| 3,506,454 | 4/1970 | Reesman | 426/242 |
| 3,539,356 | 11/1970 | Benson et al. | 426/560 X |
| 3,600,192 | 8/1971 | Tanaka et al. | 426/462 X |
| 3,600,193 | 8/1971 | Glabe et al. | 426/808 X |
| 3,652,294 | 3/1972 | Marotta et al. | 426/446 X |
| 3,656,966 | 4/1972 | Ball et al. | 426/94 |
| 3,666,511 | 5/1972 | Williams et al. | 426/808 X |
| 3,687,687 | 8/1972 | Liepa | 426/550 X |
| 3,689,279 | 9/1972 | Bedenk | 426/620 X |
| 3,703,379 | 11/1972 | Cummisford et al. | 426/808 X |
| 3,704,133 | 11/1972 | Kracauer | 426/103 X |
| 3,753,728 | 8/1973 | Bedenk et al. | 426/550 X |
| 3,800,050 | 3/1974 | Popel | 426/808 X |
| 3,830,941 | 8/1974 | Luft et al. | 426/94 X |
| 3,849,582 | 11/1974 | Blagdon et al. | 426/808 X |
| 3,851,081 | 11/1974 | Epstein | 426/446 X |
| 3,966,990 | 6/1976 | Cremer et al. | 426/549 X |

OTHER PUBLICATIONS

Peterson et al., *Encyclopedia of Food Science*, 1978, pp. 707–709.

*Primary Examiner*—Arthur L. Corbin
*Attorney, Agent, or Firm*—Gene O. Enockson; John A. O'Toole

[57] ABSTRACT

Disclosed are food compositions and methods for preparing cheese-coated puffed snack products upon simple heating of the food compositions in a consumer microwave oven. The food compositions comprise a plurality of puffable farinaceous dough puff pieces or pellets in a puffing medium throughout which the puff pieces or pellets are dispersed. The puffing medium comprises from about 30% to 90%, by weight of the puffing medium, of an edible fatty triglyceride and from about 10% to 60% by weight of dehydrated cheese solids. The puffing medium contains no more than about 2% by weight reducing sugars. The weight ratio of puffing medium to puff pieces ranges between about 0.2:1 to 1.3:1. The method of making a cheese-coated snack comprises forming a gelatinized dough, shaping the dough into pieces, partially drying the pieces, dispersing the pieces throughout a puffing medium to form a puffing medium/piece matrix, and microwave heating the matrix to simultaneously puff the pieces and to coat the pieces with the fluidized puffing medium.

12 Claims, No Drawings

FOOD COMPOSITION AND METHOD FOR PREPARING CHEESE-COATED, PUFFED SNACKS UPON MICROWAVE HEATING

BACKGROUND OF THE INVENTION

1. Field of the Invention

The present invention relates to food compositions and methods of preparation. More particularly, the present invention relates to cheese-coated snack food products of puffable farinaceous doughs and to the microwave puffing of preformed pieces of such doughs.

2. The Prior Art

It has long been known that certain farinaceous materials will expand or puff under appropriate heating conditions and will retain the expanded size upon cooling. Basically, such farinaceous materials are puffed by causing trapped moisture to expand rapidly from the liquid state to the vapor phase. Rapid heating or rapid depressurizing are the methods commonly used to convert hard, dense farinaceous dough pieces into the more palatable puffed porous crisp snack pieces.

Gun puffing exemplifies puffing by rapid depressurizing and is commonly used to prepare ready-to-eat breakfast cereals. Such products are generally prepared by puffing whole cereal grains or by puffing preformed pieces or pellets of cooked doughs prepared from various farinaceous materials. (See, for example, U.S. Pat. No. 3,253,533 issued May 31, 1966 to John O. Benson and U.S. Pat. No. 3,246,990 issued Apr. 19, 1966 to J. J. Thompson et al). The puffing pieces prior to being puffed are referred in the art as "half products" or "snack preforms." Nutritionally fortified dough formulations for gun puffing are also known (see, for example U.S. Pat. Nos. 3,687,687 issued Aug. 29, 1972 to A. L. Liepa; 3,689,279 issued Sept. 5, 1972 to W. T. Bedenk; 3,753,728, issued Aug. 21, 1973 to W. T. Bedenk et al; and 3,851,081 issued Nov. 26, 1974 to E. Epstein).

Deep-fat frying exemplifies puffing by rapid heating and is commonly used to prepare puffed snacks or dried food products (see, for example, U.S. Pat. Nos. 3,027,258 issued Mar. 27, 1962 to Markakies et al; 3,656,966 issued Apr. 18, 1972 to M. E. Ball et al; 3,600,193 issued Aug. 17, 1972 to E. F. Globe et al; 3,539,356 issued Nov. 10, 1970 to J. O. Benson et al; 3,666,511 issued May 30, 1972 to L. D. Williams et al; and 3,600,192 issued Aug. 17, 1971 to T. T. Kyoto et al.). Commercially prepared puffed snacks of this type are widely sold.

While such puffed, deep-fat fried snacks are popular, such snacks are not without disadvantages. Deep-fat fried puffed snacks typically have high fat levels which occasionally reach as high as 35% by weight. Such high fat levels render these snacks high in calories. The high fat levels also limit the shelf life of the puffed products even when carefully packaged.

Microwave heating has also been suggested as a rapid heating puffing method for various farinaceous materials including both cereals and snacks (see, for example, U.S. Pat. Nos. 3,652,294 issued Mar. 28 1972 to N. G. Makotta et al; 3,703,379, issued Nov. 21, 1972 to P. D. Cummisford et al; and 3,849,582 issued Nov. 19, 1974 to P. A. Blagdon et al.). Thus, with the increasing penetration of consumer microwave oven units into the home oven market, puffed snack products could be prepared at the consumer's convenience by microwave puffing of commercially prepared puffable farinaceous dough pellets.

While microwave methods of preparing puffed products could eliminate certain disadvantages inherent in deep-fat frying, such as high fat content and limited shelf life, microwave puffing is also not without certain disadvantages. When pellets of puffable farinaceous doughs are subjected to microwave heating not all the pellets successfully puff. Doughs formulated primarily for puffing by other puffing methods have particularly poor microwave puff success rates. Those pellets which do not successfully puff can dry, harden and even char under microwave heating. Thus, since even small numbers of unsuccessfully puffed pellets can deleteriously affect overall product quality, high puff success rates are vital to the provision of a consumer acceptable product. Also, since the field distributions of consumer microwave ovens are not uniform, even successfully puffed pellets are subject to a phenomenon characterized herein as "hot spotting." Hot spotting is the localized over-heating of smaller regions of one or more pellets. Hot spotting can undesirably cause discoloration resulting in a visually unattractive puffed piece. Hot spotting can also result in the development of off-flavors due to localized charring.

Cheese-coated puffed snacks are also well known. Such coated products are typically prepared by first forming a puffed product and, thereafter, as a separate step, combining the previously puffed product with a coating usually with simultaneous tumbling and heating. While such complex and inconvenient methods may be commercially practical to provide cheese-coated, puffed snacks, such methods of providing cheese-coated puffed snacks are not practical or are at least inconvenient for home preparation of cheese-coated puffed snacks. Thus, it would be desirable to be able to prepare a cheese-coated puffed snack conveniently by simply heating such as in a conventional consumer microwave oven whenever desired. Accordingly it is an object of the present invention to provide food compositions and methods for the preparation of cheese-coated puffed snack products upon heating by conventional consumer microwave ovens.

It is a further object of the present invention to provide puffable food compositions having high puff success rates upon microwave heating.

It is a further object of the present invention to provide food products for preparing puffed snack products which minimize hot spotting upon microwave heating.

It is a further object of the present invention to provide processes for microwave puffing farinaceous dough pieces and simultaneously coating the puffed pieces with a cheese layer which upon cooling provides a fresh, crisp snack with a cheese coating.

It has been surprisingly discovered that the above objectives can be realized and superior puffable food compositions provided by formulating a food composition comprising a plurality of discreet puffable preformed farinaceous pieces and a puffing medium through which the pieces are dispersed through or matrixed within. The puffing media comprise certain levels of an edible fatty triglyceride oil and particularly defined dehydrated cheese solids.

SUMMARY OF THE INVENTION

The present invention relates to food compositions which upon microwave heating yield a crisp, frangible snack product enrobed with a cheese coating. Such compositions comprise (A) a plurality of discreet pieces prepared from puffable farinaceous doughs, and (B) a puffing medium throughout which the pieces are dispersed. The puffing medium increases the puff success rate of the pieces by providing a relatively uniform environment to the pieces while also minimizing undesirable pellet hot spotting. Additionally, upon cooling, the puffing medium provides the puffed pieces with a flavorful cheese coating.

The puffable pieces can comprise conventional puffable farinaceous doughs which have moisture contents of between about 5% and 15% by weight of the dough. Preferred pieces are spherical pellets which range between about 2 to 20 mm. in diameter and between 0.01 to 6.0 g. in weight. Such pellets upon microwave heating expand gradually and upon cooling retain at least twice their original volume.

The puffing media of the present food composition essentially comprise an edible fatty triglyceride material and particularly defined dehydrated cheese solids. The puffing media are essentially free (i.e., less than about 1% by weight) of reducing sugars so as to avoid undesirable nonenzymatic browning reactions upon snack product preparation or extended storage. The weight ratio of puffing media to puffable pieces ranges from about 0.2:1 to 1.3:1.

In its method aspect, the present invention resides in a method of preparing a cheese coated snack product: The process comprises first the forming of a gelatinized starch-containing dough having a moisture content of between about 12% to 25% by weight. Then the dough is shaped into pieces and partially dried. The partial drying reduces the moisture content of the shaped dough pieces to between about 5% to 15% by weight. The partial drying is accomplished at between 70° F. to 200° F. and at a relative humidity above 35%. The partially dried dough pieces are then matrixed within the puffing medium such as by simple dispersing therein or enrobing therewith. The matrix is then microwave heated in a conventional consumer microwave oven for about 1–4 minutes until the pieces have expanded in volume to several times their original size. After cooling to harden the cheese coating on the puffed pieces, the prepared snacks are ready for consumption.

DETAILED DESCRIPTION OF THE INVENTION

The present invention relates to food compositions which upon simple microwave heating gradually form puffed, crisp snacks enrobed with a cheese coating. In its method aspect, the present invention relates to processes for the preparation of such snacks. The present compositions essentially comprise (A) a plurality of discreet puffable pieces dispersed or matrixed in (B) a puffing medium. Both of these composition components as well as methods of product preparation and composition use are described in detail below.

Throughout the specification and claims, percentages and ratios are by weight and temperatures are given in degrees Fahrenheit, unless otherwise indicated.

A. Puffable Pieces

The present food compositions essentially comprise a plurality of discreet puffable pieces which are dispersed through the microwave puffing medium which is described in detail below. By the term "puffable" it is meant the ability of the "pieces" to expand gradually in volume upon microwave heating at conventional consumer oven frequencies (for example, 2450, 915 or 819 MHz) and to retain at least twice their original volume (hereinafter "2×") upon cooling. The term "piece" is used herein to refer to a shaped, gelatinized dough product which has not yet been subjected to sufficient heat to cause the product to puff. The term "pellet" is used herein to refer to highly preferred puffable piece embodiments of roughly spherical shape and generally weighing between 0.01 and 6 grams. In the following description it is to be understood that puffable pieces of various shapes can be used even though pellets are specifically described.

Pellets which are subject to explosion puffing such as popcorn or with case hardened surfaces are to be strictly avoided. Such pellets upon puffing are automotive and undesirably cause splattering of the hot fluid puffing media through which the pellets are matrixed.

The puffable pellets herein are prepared from puffable gelatinized farinaceous doughs which have moisture contents essentially ranging between about 5% to 15% by weight of the pellets' dough, preferably from between about 9% to 13% and, most preferably, between about 11.5% and 12.5%. Maintenance of pellet dough moisture contents within the above given ranges is important to insure sufficient moisture to puff the pellets without scorching and to insure extended pellet shelf storage stability.

The art is replete with compositions suitable for use as the dough from which the puffable pellets are prepared and the skilled artisan will have no problem formulating particular suitable doughs. For example, suitable doughs for the pellets are disclosed in U.S. Pat. Nos. 3,246,990 (issued Apr. 19, 1966 to J. J. Thompson et al), 3,464,827 (issued Sept. 2, 1969 to T. Tsuchiya et al), 3,600,193 (issued Aug. 17, 1971 to E. F. Glable et al), 3,666,511 (issued May 30, 1972 to L. D. Williams et al) and especially in 3,652,294 (issued Mar. 28, 1972 to N. G. Marotta et al) each of which is incorporated herein by reference.

In a highly preferred embodiment, the present pellets are formed from gelatinized doughs whose total amylopectin starch content ranges between about 30% to 95%. Such doughs are referred to herein as "amylopectin doughs." The term "total amylopectin starch content" refers to the combination of the naturally occurring amylopectin starch present in any foodstuff which may be used in the dough formulation plus the added amylopectin starch in the formulation. The term "added amylopectin starch" is used to mean additional manufactured amylopectin starches which have been separated from naturally occurring foodstuffs and which have been added to the formulation to increase the amylopectin content thereof. Amylopectin, of course, is that starch which is a branched polymer comprised of chains of alpha-D-(1→4)glucopyranosyl units with sidechains randomly attached to the main chains by alpha-D-(1→6)glucopyranosyl linkages. (See Encyclopedia of Food Science, The Avi Publishing Company, Inc., Westport, Conn., 1978, pp. 707–710, which is incorporated herein by reference).

Although purified amylopectin is commercially available, the amylopectin can be readily supplied by waxy grain starches. Exemplary waxy-grain starches include waxy maize, waxy millet, waxy sorghum, waxy milo and waxy rice starches. These waxy-grain starches are derived from distinct genetic varieties of the named cereals. The designation "waxy" is derived from the glossy appearance of the grain kernel. Such waxy-grain starches are mostly amylopectin.

Dough Optional Components

A variety of materials can be added to the preferred amylopectin doughs to make the present puffed snacks more nutritious and more aesthetically or organoleptically desirable. Major optional ingredients usefully added to the preferred amylopectin doughs include additional farinaceous materials, sucrose, various protein sources, shortening and common salt.

Cereals

Other farinaceous materials can be optionally included in the present amylopectin doughs. Representative of these materials are cereal flours or starches such as those of wheat (hard or soft), rice, buckwheat, arrowroot, oat, barley, rye or any combination of two or more. If present, such farinaceous materials can comprise from about 1% to 40% of the amylopectin doughs.

Sucrose

Sucrose is another highly preferred optional component of the amylopectin dough embodiments for the pellet dough. If present, sucrose can comprise from about 0.1% to 15% of the dough and preferably between about 5% and 11%. Surprisingly, doughs containing sucrose exhibit increased puffing ability when puffed by microwave heating.

Protein

A protein source which is free (i.e., less than 2% by weight) of reducing sugars is another highly preferred optional component of the present amylopectin doughs. Such protein sources serve to increase the nutritional value of the present food products. If present, such protein sources comprise about 1% to 40% of the doughs.

Useful protein sources include, for example, cereal germs, vital gluten, soy flour, soy isolate and soy protein concentrate and mixtures thereof.

As used herein, soy flour refers to defatted and refined soybeans. Soy flour currently commercially available contains 40% to 60% protein (dry weight basis). Soy protein concentrate and soy protein isolate contain at least 70% and 90% protein (dry weight basis) respectively. The characteristic soy taste is less pronounced in the soy protein isolate and concentrate than in soy flour. Such products and their methods of preparation are more fully described in "Soybeans and Soybean Products," ed. by K. S. Markley, Interscience Publishers, Inc., New York, N.Y., Vol. 1 and 2 (1950) which is incorporated herein by reference.

Nonfat dry milk solids or conventional cheese solids are to be avoided in the pellet amylopectin doughs since such materials undesirably contain reducing sugars. Doughs containing both reducing sugars and protein can undesirably undergo non-enzymatic browning reactions upon microwave heating.

Salt

Another highly preferred optional component of the present pellet amylopectin doughs is common salt. In addition to its seasoning function, salt surprisingly has a beneficial effect upon the puffing ability of the pellet amylopectin doughs even in the presence of sucrose. If present, salt comprises from about 0.1% to 10% of the pellet dough, preferably between 0.5% to 5% and most preferably between 1% and 2%.

Shortening

Most surprisingly, conventional shortenings can be added to the pellet amylopectin doughs without significantly effecting puffability. If present, such shortenings can comprise from about 0.1% to 10% of the doughs. Suitable conventional shortening materials include, for example, edible fatty triglyceridic materials derived from cottonseed oil, soybean oil, coconut oil, peanut oil and the like. Typically, such materials are partially hydrogenated to Iodine Values of less than about 90 to increase storage stability. Other suitable shortening materials and methods of preparation are described in Bailey "Industrial Oil and Fat Products," Interscience Publishers, a division of John Wiley & Sons (3rd Edition, 1964) which is incorporated herein by reference.

Minor Ingredients

Minor optional pellet amylopectin dough ingredients include, for example, colors, dyes, flavors, vitamins, preservatives and the like. If present, such minor optional components comprise from about 0.1% to 2% by weight of the pellet dough.

Dough Preparation

Generally, the essential dry materials such as amylopectin starch together with other optional ingredients such as cereals, sugar and salt are combined with water and are formed into gelatinized doughs. Such gelatinized doughs of course can be prepared in various well-known manners. For example, gelatinized doughs can be simply prepared by admixing water and pre-gelatinized starchy materials. Pre-gelatinized materials generally, and for purposes of the present invention, are those which swell in water which is at a temperature of 25° C. to the extent that one gram of the starch will absorb at least about 10 grams of water. This determination may be conducted by dispersing one gram of pre-gelatinized starch material and 100 mm. of water (at 25° C.) which is contained in a 100 mm. graduated cylinder and thereafter noting the volume displacement by the sediment which is formed. A sediment volume of at least 10 mm. qualifies the gelatinized starchy material as one suitable for use herein.

Alternatively, gelatinized doughs can be prepared by cooking to gelatinize doughs of non-pregelatinized materials. Other choices include using some pre-gelatinized material in combination with other non-pregelatinized materials which have been separately cooked and the two materials thus separately gelatinized are mixed together to form a gelatinized dough.

When non-pregelatinized material is used, the cooking or gelatinizing of the starch material is performed under conditions commonly used in the food industry. Either a batch cooking or continuous cooking operation can be used. Different methods of cooking include heating at atmospheric pressure in an agitated kettle, heating at elevated pressure in a tumbling type mixer and heating under high pressure in a continuous mixer-extruder.

The preferred method herein of gelatinizing the starch material is by cooking in an extruder under pressure. Such a process is both continuous and flexible. For example, pregelatinized material, if used, can be simultaneously blended with the other starch material to yield a homogenous gelatinized dough. Additionally, the use of higher pressures attainable in the extruder allow the use of higher temperatures and also lower water levels than are possible with a batch type cooking operation. The use of lower water levels thus minimizes the amount of drying required in subsequent steps. For example, using an extrusion type process at 100 to 200 p.s.i.g. at about 250° to 350°, 12% to 25% water based on the total moisture is sufficient to gelatinize the dough.

The gelatinized dough can be thereafter shaped into any desired geometric form of individual or discreet puffable pieces although spherical pellets are preferred. For the preparation of small pellets, the dough can be extruded in a wide variety of equipment and the extrudate cut off in the form of small pellets ranging in size between about 2 mm. to 20 mm. in diameter and generally weighing between 0.01 to 6 g.

After such shaping/sizing, the gelatinized dough pellets can be adjusted (e.g., partially dried) to a suitable puffing moisture within the essential 5% to 15% total moisture content range. Any method of conventional drying can be used to reduce the moisture content of the pellets. The drying operation can be accomplished using equipment such as rotary bed, tray and belt driers to form the present dried dough pellets. Simple hot air convection drying is the preferred method of pellet drying.

The drying process must be controlled so that the moisture transfer to the atmosphere of the drier from the pieces is more or less uniform. If the moisture loss occurs only from the outer surface of the pellets while the inner portion of the pellets retains moisture, then the total moisture of the pellets may be within the required 5% to 15% range but the pellets will not puff or expand properly during puffing. This poor puffing results from the starch material in the outer portions of the preformed pellets having little or no moisture with which to expand during the microwave puffing step. If the air convection drying operation is carried out at about 70° to 200° F. (relative humidity at least 35%) the pellets will be dried within about 4 hours and the moisture distribution within the pellets will be proper.

B. Puffing Media

The present food compositions essentially comprise the above-described puffable pieces in combination with a puffing medium. Surprisingly, the puffing media herein not only aid the puff success rate and decrease hot spotting, but also upon cooling provide a savory cheese coating to the puffed pieces.

The weight ratio of the puffing media to the puffable pieces essentially ranges between 0.2:1 to 1.3:1 and preferably from about 0.2:1 to 0.8:1. Best results in terms of puff success rate and uniformity of cheese coating are achieved, however, when the weight ratio of puffing media to half products or pellets ranges between about 0.3:1 to 0.5:1, i.e., when there is a substantial excess of pellets to media.

The present puffing media essentially comprise an edible fatty triglyceride material and particularly defined dehydrated cheese solids. It is essential that the puffing media be substantially free of reducing sugars (i.e., no more than 1% by weight).

1. Edible Fatty Triglyceride

An edible fatty triglyceride is essentially present in the puffing media at from about 30% to 90% by weight of the puffing media. Better results are achieved when the puffing media comprise from about 40% to 60% by weight of the triglyceride component. Best results are obtained when the puffing media essentially comprise from about 40% to 45% of the triglyceride.

Conventional edible fatty triglyceride materials are suitable for use as the triglyceride component ingredient of the present puffing media. Such materials are well known in the snack and food art. Suitable edible fatty triglyceridic materials include, for example, those derived from any of the naturally occurring glyceridic materials such as coconut oil, soybean oil, cottonseed oil, peanut oil, sesame seed oil, sunflower seed and palm oil.

Suitable triglyceridic materials for use herein can be solid, liquid or fluid mixtures of solid materials in a liquid triglyceridic carrier at room temperatures. Normally, solid fatty materials or "hardstock" having Wiley melting points of up to about 110° F. can be used. Higher melting point triglyercidic materials have undesirably waxy organoleptic attributes upon consumption. Highly preferred for use herein are materials having melting points between about 70° F. to 98° F. Such materials are solid at room temperatures and thereby provide snacks which are not greasy upon handling, but yet melt at about mouth temperatures. Such normally solid materials or fat hardstock materials are obtained generally by either separating the hardstock fraction from naturally occurring materials or by hydrogenating or "hardening" naturally occurring materials to suitable melting points. A highly preferred material of this type for use herein is coconut oil which has been partially hydrogenated to a melting point of 92° F.

Normally liquid triglyceridic materials can be used in whole or in part as the triglyceride component, e.g., corn oil. Preferably, fluid mixtures of hardstock in liquid triglyceride materials are used as the triglyceride component of the present puffing media; for example, fluid fats having a Solids Contents Index of about 2% to 26% at 70° F. Such fluid mixtures are particularly advantageous to use at high triglyceride ingredient levels in the present puffing media and at high puffing media to puffable dough piece weight ratios.

Other suitable edible fatty triglyceridic materials useful in the present puffing media and methods of their preparation are also described in detail in Baily "Industrial Oil and Fat Products" referenced supra.

Most surprisingly, food grade emulsifiers are not required in puffing media comprising such fatty triglyceridic materials to yield the coated snack foods of the present invention upon microwave heating. However, food grade emulsifiers can optionally be employed to prevent any aesthetically undesirable phase separation which might occur upon storage of the product of the present food compositions.

2. Dehydrated Cheese Solids

Another essential ingredient of the present puffing media is dehydrated cheese solids. The dehydrated cheese solids ingredient is essentially present at between about 10% to 60% by weight of the puffing media. Better results in terms of coating adhesion and coating thickness uniformity are given when the dehydrated cheese solids ingredient is present in the puffing media at from about 30% to 50% by weight. Best results are obtained when the cheese solids are present at from about 40% to 45% by weight.

Dehydrated cheese solids are generally prepared by comminuting the desired type of cheese and then forming a 40% solids slurry by diluting the comminuted cheese, an emulsifier is added such as disodium phosphate and the mixture with or without homogenization is then heated to pasteurizing temperatures. Thereafter, the mixture is spray dried. More detailed descriptions of methods of preparing dehydrated cheese solids are given, for example, in "Food Dehydration," Ed. by Van Arsdel et al, (2nd Edition, 1973), Vol. 2, p. 334, which is incorporated herein by reference.

Frequently in the preparation of commercial dehydrated cheese solids, the cheese is diluted with whey rather than with water. Whey contains significant (60% to 70% dry basis) levels of lactose, a reducing sugar. It has been discovered that it is important to limit the level of reducing sugars in the present puffing media. Thus, whey enriched dehydrated cheese solids are to be avoided since such cheese solids contain significant reducing sugar lactose levels.

The puffing media herein should contain less than about 2% by weight of reducing sugars and preferably less than about 1%. During microwave heating or upon extended storage, reducing sugars could detrimentally react with the proteins of the essential dehydrated cheese solid component to yield undesirable reaction products and flavors. The term "reducing sugars" is used herein in its conventional usage to denote those carbohydrates which reduce Fehling's (or Benedict's) or Tollens' reagents. Generally, all monosaccharides whether altose or ketose are reducing sugars. Most disaccharides are reducing sugars as well; sucrose is a notable exception, for it is a non-reducing sugar. Thus, selection of materials and their concentration for use as either essential or optional media ingredients herein must depend on such material's reducing sugars content.

Thus, the dehydrated cheese solids useful in the formulation of the present puffing media should be substantially free of reducing sugars (i.e., less than about 2% of the cheese solids). Low-lactose, dehydrated cheese solids of various cheeses are commercially available and useful herein. Exemplary materials include those derived from bleu cheese, brick, cheddar, colby, provolone, parmesan and the like. Preferred dehydrated cheese solids are those prepared from cheddar cheese and parmesan.

3. Minor Puffing Media Ingredients

Conventional minor optional ingredients such as coloring agents, flavors, vitamins, preservatives and the like can also be added to the puffing media. Highly preferred for use herein are liquid, concentrated cheese flavors. If present, such minor optional ingredients comprise from about 0.1% to 2% by weight of the puffing media. Another highly preferred optional component is common salt. If present, salt can comprise from about 0.1% to 10% by weight of the present puffing media.

Composition Preparation

In one method of composition preparation, the puffing media are prepared separately from the puffable dough pieces. The puffing media can be prepared by simply blending or admixing together in any conventional manner and in any order the puffing media essential and optional components. The puffing media form paste-like semisolids due to the high dehydrated cheese solids levels. The puffable pieces can then simply be blended with the puffing media until a uniform dispersion, more or less, is prepared.

In a preferred method of food composition preparation, the pellets are enrobed with multiple layers of a puffing medium by sequentially contacting the pellets with, alternatively, the puffing medium triglyceride component and then a dry mixture of the dehydrated cheese solids component plus the balance of the optional puffing medium ingredients.

Thus, a measured quantity of the present pellets can be charged to an enrober, i.e., an open, tumble-drum mixer. The pellets are sprayed with the triglyceride component of the present puffing medium. If a normally solid fatty material is used as the triglyceride component, the material is melted prior to being sprayed onto the pellets. The pellets are then mixed until uniformly covered, more or less, with the triglyceride material. Such mixing can usually be accomplished in 2-10 minutes. Thereafter, a dry mixture comprising the essential dehydrated cheese solids plus the balance of remaining optional puffing medium ingredients is added to the enrober. The mixing is continued until the pellets are more or less evenly coated with the dry materials; e.g., another 2-10 minutes, by which time the melted fat, if used, has solidified. This sequence of steps constitutes one enrobing iteration.

Then, the pellets can be enrobed in additional layers of puffing media by subjecting the once-covered pellets to additional enrobing iterations. In a preferred method of multiple-layer pellet enrobing, substantially equal amounts of puffing media are applied in each enrobing iteration.

Composition Use

The food compositions of the present invention can be used to prepare a puffed, cheese-coated snack product upon microwave heating in a conventional consumer microwave oven. The food composition can be placed on the bottom of an uncovered microwave-proof container and heated by microwave until the puffable dough pieces slowly expand to form puffed products having volumes several times that of the unheated pieces. Upon cooling, the puffed snack food products are crisp and light, and have a savory cheese coating.

The food compositions herein are generally marketed in combination with some type of conventional packaging or dispensing means. Such means include wrappers, pouches, tubes, extruding devices and the like.

The food compositions of the present invention are illustrated by the following examples.

EXAMPLE I

A food composition of the present invention comprising a plurality of puffable dough pellets prepared from amylopectin dough dispersed in a puffing media is prepared having the following composition:

| COMPONENT | | | AMOUNT |
|---|---|---|---|
| A. Puffable Dough | | | 1,000 g. |
| Ingredient | Amount | % by Weight | |
| Corn meal[1] | 510 g. | 51.0% | |
| Pregelatinized waxy maize starch[2] | 33.3 | 33.3 | |
| Salt | 3.5 | 3.5 | |
| Moisture | 120.0 | 12.0 | |
| Color | 2.0 | 0.2 | |
| | 1,000.0 g. | 100.0% | |
| B. Puffing Media | | | 300 g. |
| Ingredient | Amount | % by Weight | |
| Dehydrated cheese solids[3] | 141 g. | 47.0% | |
| Coconut oil[4] | 117 | 39.0 | |
| NaCl | 37.5 | 12.5 | |
| Monosodium glutamate | 4.5 | 1.5 | |
| | 300.0 g. | 100.0% | |

[1]Having an amylopectin content of about 56%.
[2]"Instant Pure Flo F" marketed by National Starch Company and having an amylopectin content of about 100%.
[3]Land-O-Lakes "La Cheddar" cheese powder (approximately 1% lactose).
[4]A partially hydrogenated coconut oil having a melting point of 92° F.

In Example I, the puffable dough is prepared by charging a Readco Z arm mixer equipped with a steam jacket with 400 g. of water, the corn meal, salt and sucrose, and then is heated with moderate agitation until the mixture reaches about 212° F. Cooking is continued for 75 minutes to completely gelatinize the corn meal. Thereafter, the pregelatinized starch is added. The agitation is continued until a homogeneous dough is formed (approximately 20 minutes). The moisture content of the dough is 40%. The dough is charged to a laboratory extruder and extruded through 3/16-inch die orifice into long strands. After extrusion, the strands are dried for approximately one hour and then sliced into pieces approximately ¼-inch long. The puffable amylopectin dough pellets are dried at room temperature (68° F.) and humidity (40% relative humidity) until a 12% moisture content is obtained (approximately 12-16 hours). The total amylopectin starch content is calculated to be about 61.9%. The moisture content is determined to be about 7.3% by weight. Each pellet weighs approximately 0.4 g.

The puffing medium is prepared by adding oil to a Hobart Mixer (Model C-100). Then the dehydrated cheese solids and the remaining puffing medium ingredients are added and blended until the mix is uniform. The consistency of the puffing medium so prepared is paste-like. The total reducing sugars content is calculated to be less than about 1.1% by weight of the puffing medium.

The food composition of the present invention is prepared by adding the puffable dough pellets to the puffing medium and mixing until well dispersed therethrough. The food compositions so prepared are useful for the provision of a cheese-coated, puffed snack product upon heating in a conventional microwave oven.

Approximately 170 g. of the food composition are placed into a 1½ quart microwave-proof bowl. The bowl is placed in a consumer microwave oven, and is heated at full power for 2 minutes. The bowl is removed from the oven and stirred twice with a spatula. The food product is then heated again for 30 seconds at full power.

The pellets are expanded to a volume of 2× to 5× their original size, and are evenly coated by a savor cheese coating. After cooling between 2-3 minutes, the puffed snacks are ready for consumption.

Compositions of substantially similar physical/organoleptic character are realized when in the Example I food composition the corn meal is replaced with an equivalent amount of rye flour, wheat flour, oat flour, rice flour or barley flour.

EXAMPLE II

A food composition of the present invention having the following formulation is prepared:

| COMPONENT | | | AMOUNT |
|---|---|---|---|
| A. Puffable Dough | | | 1,000 g. |
| Ingredients | Amount | % by Weight | |
| Degerminated corn meal[1] | 499.6 g. | 49.96% | |
| Pregelatinized waxy maize starch[2] | 227.1 | 27.71 | |
| Moisture | 118.3 | 11.83 | |
| Sucrose | 77.7 | 7.77 | |
| Salt | 25.6 | 2.56 | |
| Flavor/color | 1.7 | 0.17 | |
| | 1,000.0 g. | 100.00% | |
| B. Puffing Medium | | | 644 g. |
| Ingredients | Amount | % by Weight | |
| Cheese powder[3] | 300.4 g. | 46.59% | |
| Coconut oil[4] | 252.0 | 39.13 | |
| Salt | 80.0 | 12.42 | |
| Monosodium glutamate | 11.6 | 1.86 | |
| | 644.0 g. | 100.00% | |

[1]Having an amylopectin content of about 56%.
[2]Having an amylopectin content of about 100%.
[3]Land-O-Lakes "La Cheddar" cheese powder having a total reducing sugars level of less than 1% and a moisture content of about 4%.
[4]A partially hydrogenated coconut oil having a melting point of 92° F.

In Example II, the puffable dough pellets are also prepared in a manner similar to that described in Example I. Thereafter, the pellets are charged to a benchscale stainless steel beaker tumble-type enrober of a 2 quart capacity. Approximately 40 g. of the coconut oil is heated until liquid and then the melted coconut oil is sprayed onto the pellets and mixed for approximately 5 minutes to uniformly coat the dough pellets. Then approximately 75 g. of the dry mixture of cheese solids, salt and MSG are added to the enrober and mixed for an additional 10 minutes. This procedure is then repeated two additional times.

The food composition so prepared is useful for the provision of a cheese coated puffed product upon heating in a conventional microwave oven.

Approximately 80 g. of the food composition so prepared are placed in a consumer microwave oven rated at approximately 600 watts (Litton Model No. 419) and is heated at full power (100% operating time) for two minutes, to slowly expand the puffable dough pellets to about 4.3× their original size. Of the 200 pellets so heated, all puffed to at least 2× the pellets' original size. After cooling to room temperature, the puffed snacks are ready for consumption. The total fat content of these snacks exclusive of the cheese flavor is low compared to conventional deep-fat frying snacks of this type.

Compositions of substantially similar physical/organoleptic character are realized when in the Example II food composition, the cheddar cheese solids are replaced with an equivalent amount of dehydrated cheese solids obtained from bleu cheese, colby and parmesan cheese.

EXAMPLE III

A food composition of the present invention having the following formulation is prepared:

| COMPONENT | | | AMOUNT |
|---|---|---|---|
| A. Puffable Dough | | | 100.0 g. |
| Ingredients | Amount | % by Weight | |
| Instant potato flakes | 42.75 g. | 42.75% | |
| Pregelatinized waxy maize starch[1] | 33.00 | 33.00 | |
| Salt | 4.00 | 4.00 | |
| Water | 10.00 | 10.00 | |
| Color | 0.25 | 0.25 | |
| | 100.00 g. | 100.00% | |
| B. Puffing Medium | | | 128.4 g. |

| COMPONENT | | AMOUNT |
|---|---|---|
| Ingredients | Amount | % by Weight |
| Corn oil | 80.0 g. | 62.30% |
| Cheese solids | 30.0 | 23.36 |
| Salt | 10.0 | 7.79 |
| Carboxymethyl cellulose | 5.0 | 3.89 |
| Onion powder | 2.0 | 1.56 |
| Garlic powder | 1.0 | 0.78 |
| Black pepper | 0.4 | 0.32 |
| | 128.4 g. | 100.00% |

[1] "Instant Pure Flo F"

Such a food composition is prepared in a manner similar to that described in Example I, except that the corn oil is initially admixed with the cellulose thickener and the dough pieces are formed into approximately 5 g. disks. The composition so produced is in the form of a puffing medium puffable pieces matrix and is useful in the preparation of puffed snack products coated with a savory cheese coating. Upon microwave heating in a conventional consumer microwave oven, the puffable dough pieces of the food compositions slowly puff to a size approximately 3×–5× their original volume. Puff success rates exceeding 95% are exhibited by the food composition. The puffable pieces exhibit minimal hot spotting as evidenced by either patching or textural impairment.

What is claimed is:

1. A food composition which upon microwave heating yields a cheese-coated, puffed snack, comprising:
   A. a puffing medium consisting essentially of:
      1. from about 30% to 90% by weight of the puffing medium of an edible fatty triglyceride, and
      2. from about 10% to 60% by weight of the puffing medium of dehydrated cheese solids, and wherein the puffing medium contains less than about 2% by weight of reducing sugars; and
   B. a plurality of puffable preformed dough pieces dispersed through the puffing medium, said dough pieces comprising a gelatinized starch-containing dough having a moisture content of from about 5% to 15% by weight of the dough;
   wherein the weight ratio of dough pieces to puffing medium is about 1:0.2 to 1:1.3.

2. A composition in accordance with claim 1 wherein the puffing medium contains less than about 1% by weight reducing sugars.

3. A composition in accordance with claim 2 wherein the dehydrated cheese component comprises from about 30% to 50% by weight of the puffing medium.

4. A composition in accordance with claim 3 wherein the dough pieces range between about 0.01 to 6.0 g. in weight.

5. A composition in accordance with claim 4 wherein the weight ratio of dough pieces to puffing medium is about 1:0.2 to 1:0.8.

6. A composition in accordance with claim 5 wherein the puffing medium comprises from about 40% to 60% by weight of the medium of the edible fatty triglyceride.

7. A composition in accordance with claim 6 wherein the puffing medium additionally comprises from about 0.1% to 10% by weight of salt.

8. A process for preparing a cheese-coated snack product by microwave heating, comprising the steps of:
   A. forming a gelatinized starch-containing dough having a moisture content of about 12% to 25% by weight;
   B. shaping the dough into a plurality of discreet pieces;
   C. partially drying at a temperature of about 70° F. to 200° F. and at a relative humidity of at least 35% for a period of time sufficient to reduce the moisture content of the pieces of between about 5% to 15%;
   D. dispersing the partially dried pieces throughout a puffing medium consisting essentially of, from about 30% to 90% by weight of the puffing medium, an edible fatty triglyceride and from about 10% to 60% by weight of dehydrated cheese solids; and wherein the weight ratio of puffing medium to the pieces is about 0.2:1 to 1.3:1 and wherein the puffing medium contains less than about 2% by weight of reducing sugars, to form a puffing medium piece matrix;
   E. microwave heating the matrix for about 1–4 minutes to form a plurality of puffed pieces enrobed in a cheese coating; and,
   F. cooling to room temperature to harden the cheese coating on the puffed pieces.

9. A process in accordance with claim 8 wherein the weight ratio of puffing medium to the pieces is about 0.2:1 to 0.8:1.

10. A food product prepared by the process of claim 9.

11. A process in accordance with claim 8 wherein the puffing medium additionally comprises from about 0.1% to 10% of common salt.

12. The method of claim 11 wherein the puffing medium contains less than about 1% by weight reducing sugars.

* * * * *